Patented Mar. 18, 1952

2,589,275

UNITED STATES PATENT OFFICE 2,589,275

PREPARATION OF 3-METHYL-CITRALS

Yves-René Naves, Geneva, Switzerland, assignor to The Givaudan Corporation, a corporation of New Jersey No Drawing. Application February 4, 1948, Serial No. 6,358

2 Claims. (Cl. 260—603)

This invention relates to novel chemical products, viz. 3-methyl-citrals, and to a novel process for preparing them.

The novel products of this invention possess pleasant odoriferous properties and themselves can be used to prepare other products having notable odoriferous characteristics.

The new substances may be represented by their structural formula as follows for the β- or isopropylidenic forms:

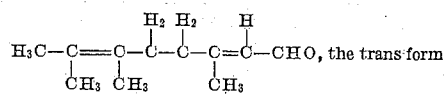

and

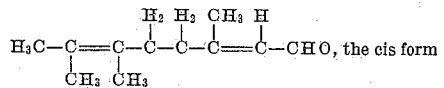

and the corresponding formulas for the α- or isopropenylic forms. Accordingly, it will be understood that wherever the context so permits, the term 3-methyl-citrals, as used in the description and claims herein, is intended to include all products having the above indicated structural formulas as well as any and all stereoisomers thereof.

In general, the novel 3-methyl-citrals may be prepared by subjecting the corresponding 3-methyl-linalools, which may be represented as follows:

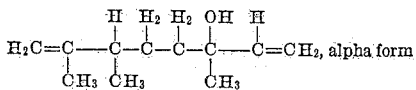

and

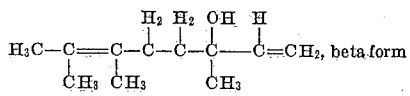

to limited oxidation in the presence of chromic acid.

The reaction products may be isolated by fractional distillation to yield fractions rich in 3-methyl citrals suitable for further syntheses in which the alcohols present are not affected or are converted into products easy to separate from the desired products. If desired, the fractions rich in 3-methyl-citrals or the neutral crude oxidation products can be treated with aldehyde-addition agents, such as sodium bisulfite, in order to remove the 3-methyl-citrals in the form of addition products. The 3-methyl-citrals can then be regenerated in accordance with known procedures and obtained in substantially pure form by fractional distillation. In the latter case, that is where the 3-methyl-citrals are removed from the other reaction products in the form of addition compounds and then regenerated, one part of the 3-methyl-citrals exhibits less reactivity and another part becomes so closely held in combination that it cannot be regenerated.

The 3-methyl-citrals can be isolated and then subjected to condensation reactions with ketones such as acetone and n-butanone, the condensation products, after cyclization, yielding products of special value.

The following examples illustrate the practice of my invention, which however is not to be construed as limited to them. Among others, variations may be made in mixtures of bichromate and acids employed to liberate chromic acid, in place of the sodium bichromate and sulfuric acid used above. If desired, chromic acid per se may be employed, or the proportions of the reactants and the temperature and duration of the reaction may be varied.

EXAMPLE 1

*Preparation of 3-methyl-linalools (2,3,6-trimethyl-octadiene-2,7-ol-6)*

Pinacone hydrate was dehydrated by means of aniline hydrobromide in accordance with the method of Kyriakydes, J. A. C. S., 36, 991 (1914). The yield was 71 per cent of theory of 2,3-dimethyl-butadiene, as an easily polymerizable liquid, boiling at 70° to 71° C.

300 grams of the 2,3-dimethyl-butadiene were treated between —5° and 0° C. with a current of dry hydrogen bromide obtained by the combustion of 323 grams of bromine in an excess of hydrogen gas. The operation took two hours and thirty minutes. After 72 hours in the dark at 0° C., the product was fractionally distilled. There was obtained a 73 per cent of the theoretical yield of 1-bromo-2,3-dimethyl-butene-2, as a colorless, strongly lachrymose liquid having a boiling point of 65° to 66° C. under a pressure of 40 mm. of mercury; $d_4^{20}=1.2537$; $n_C^{20} = 1.49049$; $n_D^{20} = 1.49484$; $n_F^{20} = 1.50539$; $(n_F-n_C \times 10^4) = 149.0$; delta$=118.9$; $RM_D=37.91$ (calculated$=37.205$).

The bromo compound prepared as above was condensed with sodium ethyl acetoacetic ester in known manner. The resulting ketone, 2,3-dimethyl-heptene-2-one-6, was obtained in a yield of 88 per cent of theory on the basis of the bromo compound employed. The ketone is a colorless, mobile liquid having an odor similar to that of methyl heptenone; a boiling point of 84° C. under 17 mm. of mercury pressure; $d_4^{20}=0.8634$; $n_C^{20} = 1.44727$; $n_D^{20} = 1.45022$; $n_F^{20} = 1.45739$; $(n_F-n_C) \times 10^4 = 101.2$; delta$=117.2$; $RM_D=43.63$ (calculated$=43.30$).

In a liter round-bottom flask filled with nitrogen 33 grams of finely-pulverized sodamide and 430 c. c. of dry ether were introduced. Then over a space of 100 to 120 minutes a mixture of 100 grams of the dimethyl heptenone prepared as above and 450 c. c. of ether were added, under vigorous stirring and at a temperature of 10° C. After three hours of agitation, the current of nitrogen was replaced with a current of pure and dry acetylene, the flask then being cooled down from about 10° to 15° C. to about 0° C. After twenty-four hours the product was poured over ice, washed, dried, freed of ether and fractionally distilled. There was isolated, after a few grams of the starting ketone, 102 grams (86.1 per cent of theory) of 2,3,6-trimethyl-octene-2-yne-7-ol-6, having a boiling point of 99° to 99.5° C. under a pressure of 10 mm. of mercury; $d_4^{20}=0.8888$; $n_C^{20} = 1.46638$; $n_D^{20} = 1.46932$; $n_F^{20} = 1.47644$; $(n_F-n_C) \times 10^4=100.6$; delta$=113.2$; $RM_D=52.18$ (calculated$=52.05$).

$C_{11}H_{18}O$ (166.254): Calculated: C, 79.45; H, 10.67%. Found: C, 79.56; H, 10.84%.

100 grams of the acetylenic alcohol prepared as above was mixed with 300 c. c. of ethyl alcohol and about 7.5 grams of Raney nickel. The solution absorbed 15,000 c. c. of hydrogen (20° C. and 730 mm. of mercury pressure) in 135 minutes, 50 per cent being absorbed in 68 minutes, 75 per cent in 102 minutes, and 90 per cent in 122 minutes.

The product was purified by distillation. The Raman spectra show that the resulting 2,3,6-trimethyl-octadiene-2,7-ol-6 is practically entirely free of the starting acetylenic alcohol. The properties of the product follow:

Boiling point—77 to 78° C. under a pressure of 3.6 mm. of mercury and 94 to 95° C. under a pressure of 10 mm. of mercury; $d_4^{20}=0.8737$; $n_C^{20} = 1.46418$; $n_D^{20} = 1.46708$; $n_F^{20} = 1.47417$; $(n_F-n_C) \times 10^4=100.1$; delta$=114.6$; $RM_D=53.41$ (calculated$=53.59$).

$C_{11}H_{20}O$ (168.270): Calculated: C, 78.49; H, 11.99%. Found: C, 78.62; H, 11.97%.

EXAMPLE 2

Preparation of 3-methyl citrals (2,3,6-trimethyl-octadiene-2,6-al-8)

150 grams of 3-methyl-linalools prepared as above were emulsified under agitation at around 95° C. with 375 grams of water. A mixture of 168 grams of sodium bichromate, 247 grams of sulfuric acid (66° Baumé), and 375 grams of water were added over a space of 30 minutes, without stopping violent agitation and at the same time maintaining the temperature at around 95° C. through externally applied cooling means. Agitation was continued for 5 minutes after the completion of the addition of the oxidation mixture, whereupon the contents were rapidly cooled.

300 grams of benzene were then added to the reaction mixture, the benzene layer was decanted, and then washed with a 5 per cent solution of sulfuric acid, followed by a water wash, followed by a wash with an 8 per cent solution of sodium bicarbonate, followed by another water wash, and finally by a dilute solution of acetic acid. The benzene was removed by distillation and the residue, weighing 130 grams was systematically distilled. Fractions as follows were obtained:

12 grams of a forerun containing some dimethyl-heptenones;

54 grams of 3-methyl-linalools which can be used again;

9 grams of a mixture of methyl-linalools and methyl-citrals, analyzing 37 per cent aldehyde content by oximation; and 53 grams of a mixture of the same nature containing in addition alcohols isomeric with methyl-linalools and analyzing 88 per cent aldehyde content by oximation.

This corresponds with a yield of about 55 per cent crude product on the basis of the weight of methyl-linalools consumed.

The fractions containing the methyl-citrals were treated with an aqueous solution of sodium bisulfite under conditions usually employed to isolate citrals. Thus from the last of the above-mentioned fractions were isolated 35 grams, or 75 per cent of the aldehydes shown to be present by the oximation, of a mixture of 3-methyl-citrals.

The 3-methyl-citrals obtained by liberating same from the bisulfite addition product with sodium hydroxide had a heavy lemon-like very agreeable odor and other properties as follows:

Boiling point$=91°$ C. to 92° C. under a pressure of 2.8 mm. of mercury, or 116° C. to 117° C. under a pressure of 10 mm. of mercury; $d_4^{20} = 0.8990$; $n_C^{20} = 1.48905$; $n_D^{20} = 1.49352$; $n_F^{20}=1.50434$; $(n_F-n_C) \times 10^4=152.9$; delta$=170.1$; $RM_D=53.80$ (calculated$=52.07$).

$C_{11}H_{18}O$ (166.254): Calculated: C, 79.45; H, 10.67%. Found: C, 79.63; H, 10.72%.

The fraction of 3-methyl-citrals which did not combine with the sodium bisulfite was fractionally distilled. It yielded, to the extent of 16 per cent of the initial aldehyde fraction, a mixture having an odor strongly reminiscent of vervain and titrating 62 per cent aldehyde by oximation. Other properties follow:

Boiling point$=92°$ C. to 93° C. under a pressure of 2.6 mm. of mercury; $d_4^{20} = 0.9050$; $n_C^{20} = 1.48798$; $n_D^{20} = 1.49232$; $n_F^{20} = 1.50284$; $(n_F-n_C) \times 10^4=148.6$.

The 3-methyl-citrals regenerated from their bisulfite addition products when treated with the acetate of semicarbazide immediately gave the semicarbazones. After crystallization from methyl alcohol a grainy, powdery semicarbazone was obtained, the melting point being 209° to 209.5° C., accompanied by a small amount of a more soluble semicarbazone in the form of pearly leaves having a melting point of 183° to 184° C.

The 3-methyl-citrals regenerated by the hydrolysis of the two semicarbazones had similar intensely-lemon-like odors and colored identically when treated with m-phenylenediamine.

The aldehydic fraction which did not combine with sodium bisulfite gave a mixture of the semicarbazones containing proportionately more of the product melting at 183° to 184° C.

0.2 gram of semicarbazone melting at 209° to 209.5° C. were converted into 2,4-dinitro-phenyl-hydrazone in the usual manner. This derivative, recrystallized from methyl alcohol, was in the form of brilliant red-orange needles melting at 145.5° to 146° C.

$C_{17}H_{22}O_4N_4$ (346.378): Calculated: C, 58.93; H, 6.405; N, 16.18%. Found: C, 58.76; H, 6.20; N, 16.12%.

EXAMPLE 3

*Preparation of 3-methyl-citrals (2,3,6-tri-methyl-octadiene-2,6-ol-8)*

440 grams of 3-methyl-linalools prepared as above were emulsified in 1350 grams of water under rapid agitation. A mixture of 485 grams of sodium bichromate, 416 grams of sulfuric acid (66 degrees Baumé) and 2550 grams of water were added over the space of sixty minutes without stopping agitation. The temperature rose rapidly from 20° to 60° C. at which latter level it was maintained through the application of convenient external cooling means. Agitation was continued for fifteen minutes after the completion of the introduction of the oxidation mixture.

The treatment from this point on was the same as in the preceding example. There was isolated:

72 grams of forerun containing dimethyl-heptenones;
165 grams of methyl-linalools;
30 grams of intermediate fractions analyzing 33 per cent oximable products, expressed as methyl-citrals; and
137 grams of fractions containing 87 per cent of methyl-citrals.

This corresponds to a yield of about 60 per cent by weight of crude 3-methyl-citrals on the basis of methyl-linalools consumed.

The methyl-citrals were extracted from the last above fractions by treatment with sodium bisulfite. A mixture of 98 grams of methyl-citrals having the properties indicated in the preceding example and being free of other products was obtained.

EXAMPLE 4

*Preparation of 3-methyl-citrals (2,3,6-trimethyl-octadiene-2,6-ol-8)*

100 grams of 3-methyl-linalools prepared as above were dissolved in 500 grams of acetic acid containing 10 per cent of water and were brought to a temperature of 40° to 50° C. 42 grams of chromic anhydride dissolved in a mixture of 40 grams of water and 120 grams of acetic acid were added under vigorous agitation and over a space of ten minutes. The temperature was maintained at about 60° C. through the use of convenient externally applied cooling means. Agitation was continued for five minutes as above and the contents were diluted with 1500 grams of water.

Proceeding from this point on as in Example 2, the following fractions were isolated:

15 grams of forerun containing dimethyl-heptenones;
38 grams of methyl-linalools;
4 grams of intermediate fractions;
35 grams of fractions comprising 92 per cent of 3-methyl-citrals, the latter being isolated from the fractions in accordance with the procedure of Example 2.

The foregoing illustrates the invention, which however is not to be limited thereby but is to be construed as broadly as permissible in view of the prior art and limited solely by the appended claims.

I claim:

1. A process for making 3-methyl-citrals, which comprises adding a mixture of sodium bichromate, sulfuric acid and water to an aqueous emulsion of 3-methyl-linalools while maintaining agitation and under a temperature within the range from about 60° C. to 95° C., and removing the 3-methyl-citrals from the reaction mixture.

2. A process in accordance with claim 1 wherein the 3-methyl-citrals are isolated by treating the reaction product with sodium bisulfite and regenerating the 3-methyl-citrals from the resulting addition product.

YVES-RENÉ NAVES.

REFERENCES CITED

The following references are of record in the file of this patent:

Gildemeister et al.: "The Volatile Oils," vol. 1, pages 408 and 409, John Wiley & Sons, 1913.

Ruzicka et al.: Helv. Chim. Acta, vol. 23, pages 959 to 974 (1940).

Naves et al.: Helv. Chim. Acta, vol. 30, pages 1599 to 1613, October 15, 1947.